(No Model.)
G. E. BATSFORD.
HANDLE FOR COFFEE OR TEA POTS.
No. 421,807. Patented Feb. 18, 1890.
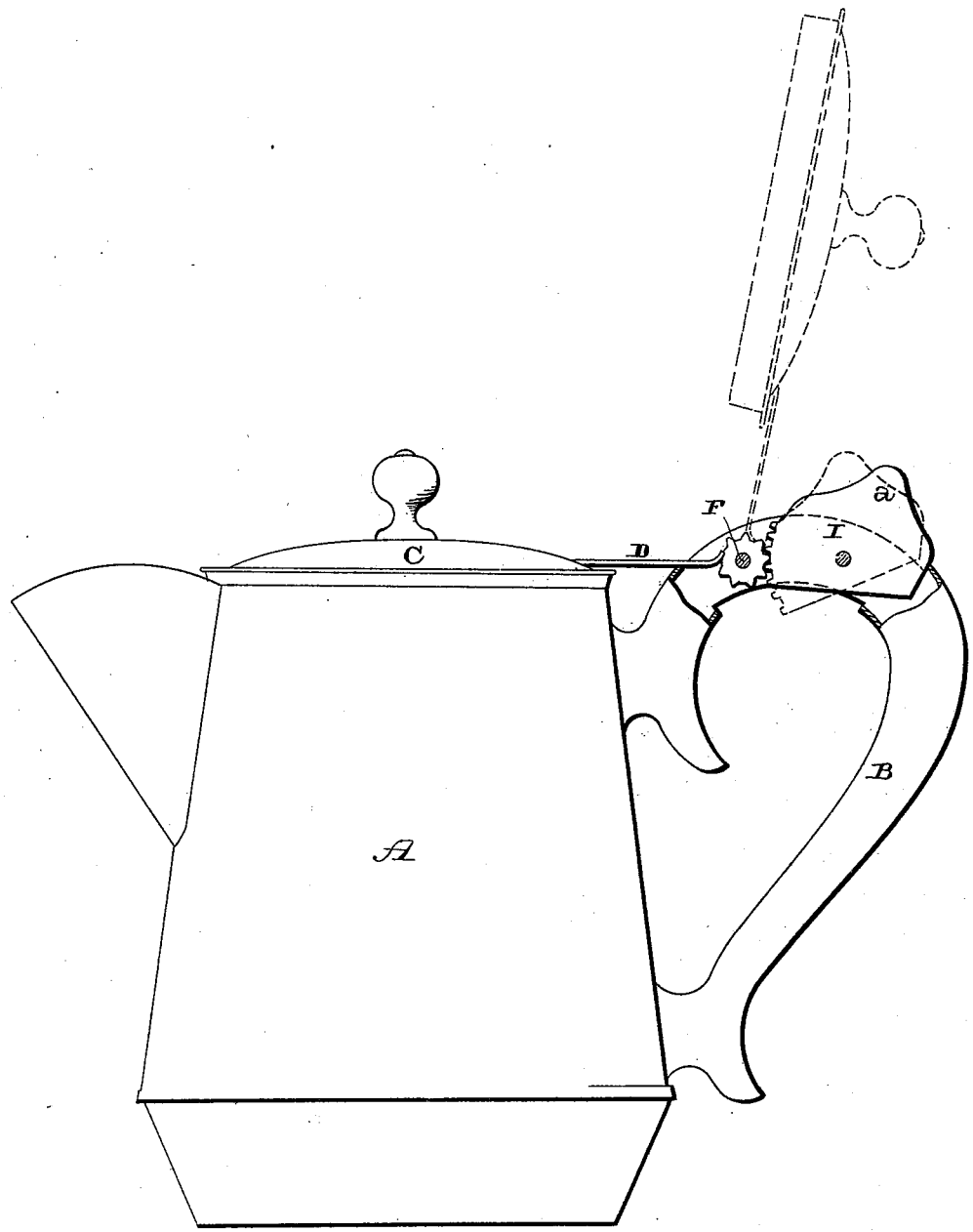
Witnesses:
E. P. Ellis,
L. J. Magie
Inventor:
Geo. E. Batsford,
per
J. A. Lehmann,
Atty.

UNITED STATES PATENT OFFICE.

GEORGE E. BATSFORD, OF McLEAN, NEW YORK.

HANDLE FOR COFFEE OR TEA POTS.

SPECIFICATION forming part of Letters Patent No. 421,807, dated February 18, 1890.

Application filed November 29, 1889. Serial No. 331,924. (No model.)

*To all whom it may concern:*

Be it known that I, GEORGE E. BATSFORD, of McLean, in the county of Tompkins and State of New York, have invented certain new and useful Improvements in Handles for Coffee or Tea Pots; and I do hereby declare the following to be a full, clear, and exact description of the invention, such as will enable others skilled in the art to which it pertains to make and use it, reference being had to the accompanying drawing, which forms part of this specification.

My invention relates to an improvement in handles for coffee or tea pots; and it consists in the combination of a receptacle of any kind provided with a handle, of a pivoted arm or lever which is rigidly secured to the cover at one end, and is provided with teeth or cogs at the other, and a pivoted operating-lever, which is pivoted in the top of the handle and provided with teeth at its inner end, so as to engage with the teeth upon the pivoted arm and which is adapted to be operated by the pressure of the thumb or finger, as will be more fully described hereinafter.

The object of my invention is to provide a means for opening and closing the cover of a receptacle of any kind that is provided with a handle without having to apply the hand directly to the cover for that purpose.

The accompanying drawing represents my invention.

A represents a tea or coffee pot or a receptacle of any kind, to which the handle B and cover C are applied in the usual manner. Rigidly secured to that edge of the cover which is next to the handle is an arm or lever D, which has its outer end to project into a slot or recess formed in the top of the handle B, and which outer end has a pivotal pin or bolt F passed through it, and has teeth or cogs formed upon it, as shown; also, pivoted in the slot or opening formed in the top of the handle is the operating-lever I, which has its outer upper corner to project sufficiently far above the top edge of the handle to form a firm bearing for the thumb or one of the fingers, and has its inner end provided with teeth or cogs, so as to mesh with the teeth or cogs upon the inner end of the pivoted arm or lever. These levers are pivoted in position so as to always retain the same relative relation to each other, and each one turning upon its pivot causes the other to move in an opposite direction. When the pressure of the thumb or finger is applied to the outer projecting corner *a* of the operating-lever toward the receptacle, the cover is raised so as to give access to the interior of the vessel or receptacle, and when the pressure is applied in the shape of a downward and outward pull upon the upper projecting point of this operating-lever the cover is forced downward upon the receptacle and held in that position.

The great merits of our invention consist in the cheapness and simplicity of the parts and to the fact that they are not liable to get out of order.

The mere pressure of the finger or thumb against the operating-lever is sufficient to either open or close the cover, as may be desired.

Having thus described my invention, I claim—

1. The combination of a receptacle, a handle secured thereto, and the cover, with the arm or lever secured at its inner end to the cover and pivoted upon the handle and provided with teeth or cogs at its inner end, and the operating-lever also pivoted upon the handle and provided with cogs or teeth at its inner end and with the projecting point or corner to receive the pressure of the thumb or finger, the two levers being made to move in opposite directions, substantially as shown and described.

2. The combination of the receptacle, the handle B, secured thereto and provided with a slot, opening, or recess in its upper portion, the cover, the arm or lever secured to the cover at one end and pivoted inside of the slot or opening at the other, the operating-lever also pivoted in the slot or opening in the handle and provided with a projection or point at its upper end, which extends a suitable distance above the top edge of the handle, the two pivoted levers being provided with teeth or cogs at their inner ends, substantially as set forth.

In testimony whereof I affix my signature in presence of two witnesses.

GEORGE E. BATSFORD.

Witnesses:
D. W. ROWLEY,
EZRA ROGERS.